United States Patent [19]
Christiansen et al.

[11] Patent Number: 4,988,220
[45] Date of Patent: Jan. 29, 1991

[54] SERVICABLE WHEEL SPEED SENSOR ASSEMBLY

[75] Inventors: Paul J. Christiansen, Sandusky; David A. Foster, Castalia, botth of Ohio

[73] Assignee: General Motors Corporation, Detroit, Mich.

[21] Appl. No.: 522,697

[22] Filed: May 14, 1990

[51] Int. Cl.⁵ .................... F16C 19/52; G01P 3/48; H02K 21/38
[52] U.S. Cl. ...................... 384/448; 310/168; 324/207.25
[58] Field of Search ............... 384/448; 310/168, 155; 324/166, 207.22, 207.25; 340/682

[56] References Cited

U.S. PATENT DOCUMENTS

| | | | |
|---|---|---|---|
| 3,683,219 | 8/1972 | Kruse | 310/168 |
| 3,719,841 | 3/1973 | Ritsema | 310/155 |
| 3,772,549 | 11/1973 | Cumming | 310/168 |
| 3,947,712 | 3/1976 | Burckhardt et al. | 310/168 |
| 4,090,592 | 5/1978 | Jovick et al. | 310/168 X |
| 4,259,637 | 3/1981 | Bloomfield etal. | 324/166 |
| 4,732,494 | 3/1988 | Guers et al. | 384/448 |
| 4,795,278 | 1/1989 | Hayashi | 384/448 |
| 4,850,722 | 7/1989 | Bayer | 384/448 |
| 4,946,295 | 8/1990 | Hajzler | 384/448 |
| 4,946,296 | 8/1990 | Olschewski et al. | 384/448 |
| 4,948,277 | 8/1990 | Alff | 384/448 |

Primary Examiner—Thomas R. Hannon
Attorney, Agent, or Firm—Patrick M. Griffin

[57] ABSTRACT

A circumferential type wheel speed sensor is axially fitted in removable fashion over a specially designed elastomer sleeve molded to the outside of a cylindrical casing wall. The sleeve also fills in and seals an array of slots cut through the wall, which cooperate with teeth on a flux ring to create a strong signal. The sensor can be removed for service without removing or creating exposing openings through the seal.

3 Claims, 2 Drawing Sheets

SERVICABLE WHEEL SPEED SENSOR ASSEMBLY

This invention relates to automotive vehicle wheel speed sensor assemblies in general, and specifically to a sensor assembly that may be partially disassembled without exposing the wheel bearing to the environment.

BACKGROUND OF THE INVENTION

Vehicle wheel speed sensors can be divided into two broad categories, active and passive. Active sensors continually provide outside power to a sensor component, such as a hall effect transducer, and are consequently relatively expensive. Passive sensors, since they need no outside power, are relatively less expensive. Passive sensors provide a magnetic field with some type of magnet, generally combined in proximity with a sensing coil into a single sensor component. The coil-magnet component is usually mounted fixed relative to the vehicle, since it has signal wires leaving it. A variable reluctance ring, generally a toothed iron ring, is mounted so as to turn at the speed of the wheel, within the magnetic field, thereby creating an electric signal that varies with wheel speed.

Passive sensors are often combined with a bearing assembly, either directly with the wheel bearing, or with a bearing somewhere else in the drive line. This is an obvious choice, since a bearing provides a fixed race and a race rotating at wheel speed in close proximity. The ring can be mounted to the rotating race and the sensor component to the fixed race. Combining such a sensor with a bearing provides another advantage in that bearings typically already have a seal that encloses an annular space between the races, protecting the bearing rolling elements and retaining lubricant. If the annular space is large enough, it is a simple matter to mount the ring to the rotating race within the annular space, where it is shielded by the bearing seal that is already there. The same can be done for the sensor component, depending on what type it is.

The coil-magnet components in passive sensors fall into two broad sub categories, the probe type and the circumferential type. In the probe type, a coil wraps a magnet and iron pole piece, in a general probe shape. The probe can be inserted either through a hole in a bearing housing, or, alternately, through a hole directly in the bearing seal, depending on the room available and on how solidly mounted the seal is. The end of the probe then faces the ring, and both the end of the probe and the ring are protected within the enclosed annular space. In the circumferential type, an annular magnet and wire coil are combined into a ring-shaped component. This single component, if small enough, can be mounted to the fixed race within the annular space, near the rotating toothed ring, and both protected by the same seal. In either case, removing the coil-magnet component for servicing involves either leaving an empty hole through the seal, in the case of the probe type sensor, or removing the entire seal, in the case of the circumferential type sensor. This leaves the bearing and its lubricant supply exposed. This problem could be avoided by simply plugging the holes during the servicing process. Or, the bearing could be redesigned with a separate sealed chamber for the sensor components entirely outboard of the bearing seal. Either alternative involves extra steps and expense, however, and the latter could potentially take up significantly more space.

SUMMARY OF THE INVENTION

The invention provides a circumferential type speed sensor assembly combined with a wheel bearing seal in such a way as to be easily removed for servicing without exposing the sealed annular space.

In the embodiment disclosed, a vehicle wheel bearing has a fixed race and a coaxial rotating race, defining an annular space therebetween. A toothed iron ring is mounted to the rotating race, within the annular space. The ring teeth are arranged in an axially extending, cylindrical pattern. A stamped steel seal casing mounted to the fixed race encloses the annular space between the races, and has an axially extending cylindrical wall that coaxially overlies the ring teeth. A circular array of openings cut through the casing wall forms a matching array of fingers that overlie the ring teeth, turning past them as the races rotate. An elastomer sleeve is molded over the outside of the casing wall to fill in the openings and maintain the enclosure. The sleeve is molded with a flexible circular lip behind which is formed an axially extending channel-shaped trough that overlies the fingers and teeth. The speed sensor is a ring-shaped coil and magnet type, molded inside a plastic shell that has an inner diameter just smaller than the lip, but equal to the trough. Therefore, the sensor can be pushed axially over the wall and sleeve lip, flexing it out of the way as it snaps snugly into the trough. Then, it is properly positioned to read the signal generated by the relatively turning teeth and fingers, but may be easily pulled axially off for servicing without exposing the bearing space.

It is, therefore, a general object of the invention to provide a vehicle wheel speed sensor that can be easily removed for servicing without interrupting the seal of the bearing space.

It is another object of the invention to provide a combined seal and speed sensor assembly in which a toothed ring is protected within an annular bearing space enclosed by a seal casing wall, and in which an array of openings cut through the casing wall so as to form fingers that work in cooperation with the teeth is filled in by a molded elastomer sleeve that also removably holds a ring type sensor to the outside of the casing wall.

It is another object of the invention to provide such an assembly in which the teeth, casing wall and fingers, as well as a trough molded into the elastomer sleeve are all axially extending, so that the sensor can be axially assembled and removed.

DESCRIPTION OF THE PREFERRED EMBODIMENT

These and other objects and features of the invention will appear from the following written description, and from the drawings, in which.

Figure 1:
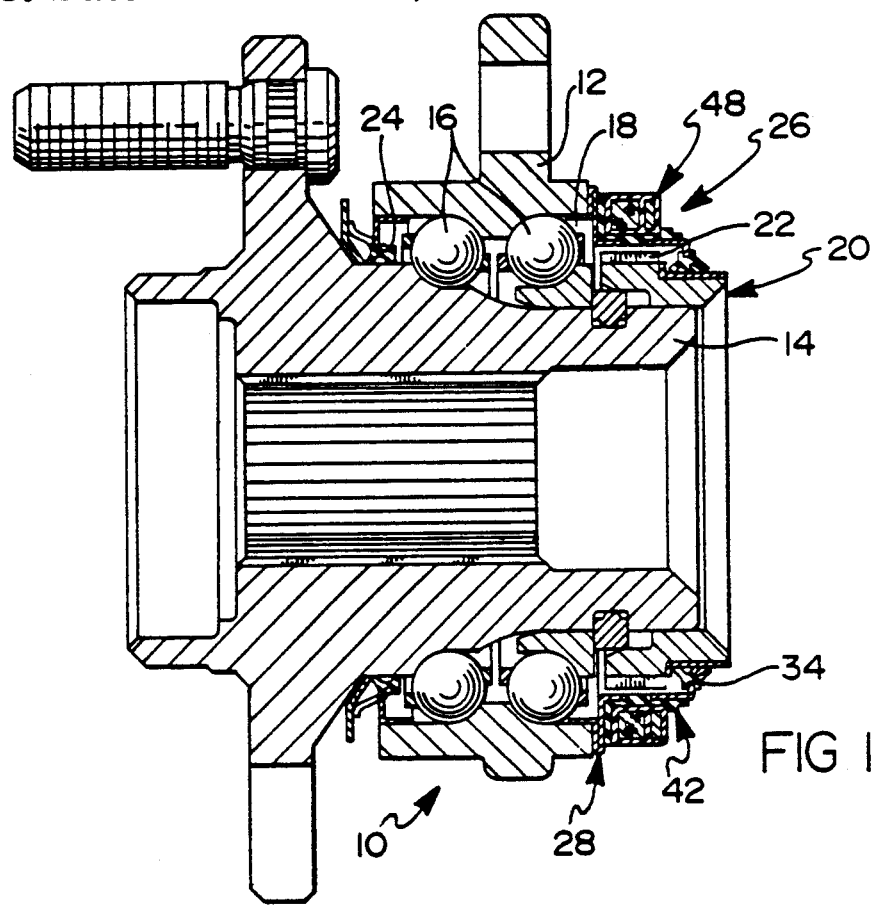
FIG. 1 is a cross sectional view through a vehicle wheel bearing incorporating a preferred embodiment of the invention.

Referring first to FIG. 1, a vehicle wheel bearing is indicated generally at 10. Bearing 10 has a fixed outer race 12 and a rotatable inner race 14. Outer race 12 is bolted to a vehicle suspension, not shown, while inner race 14 would be bolted to a wheel, turning at wheel speed. The races 12 and 14 are kept coaxial by a double row of bearing balls 16, creating an annular volume or space 18 between them. Annular space 18 contains a supply of lubricant, not illustrated, as well as a variable reluctance ring 20. Ring 20 is made of iron or steel, machined with a cylindrical array of magnetic portions, which here are axially extending projections or teeth 22 coaxially surrounding inner race 14. In order to retain the lubricant and protect ring 20, annular space 18 must be sealed or enclosed from the environment. This is done by a conventional seal 24 at one end, in cooperation with the combined seal and speed sensor assembly of the invention, a preferred embodiment of which is indicated generally at 26.

Figure 2:
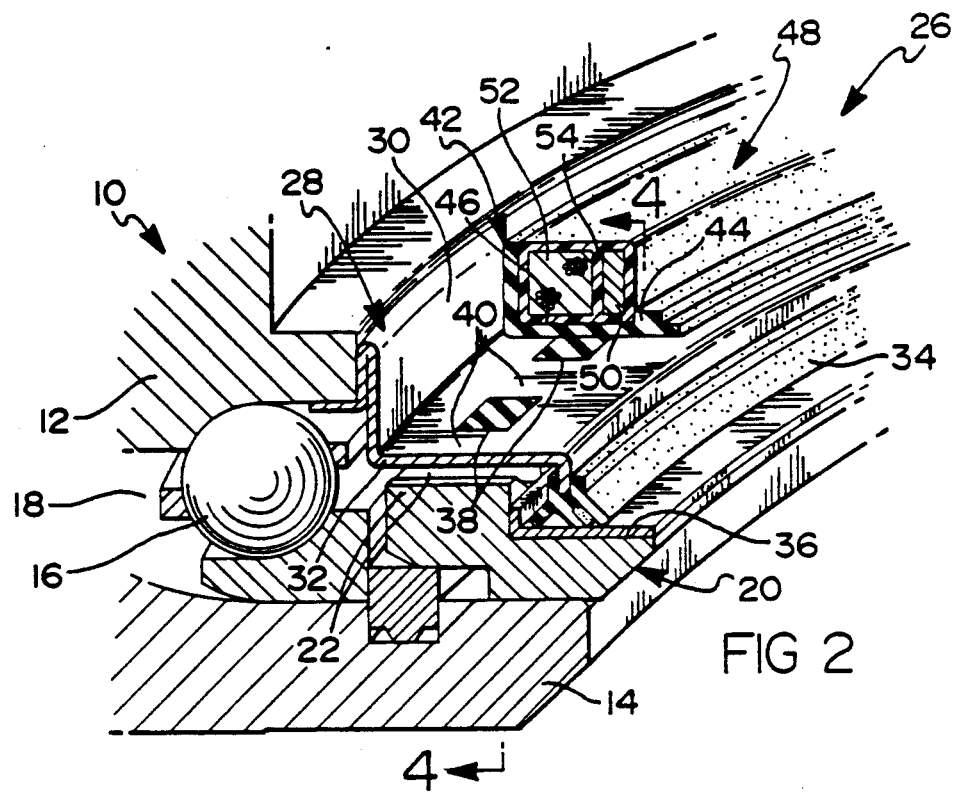
FIG. 2 is an enlarged perspective view of a portion of the bearing and the invention cross sectioned through two different planes.
Figure 4:
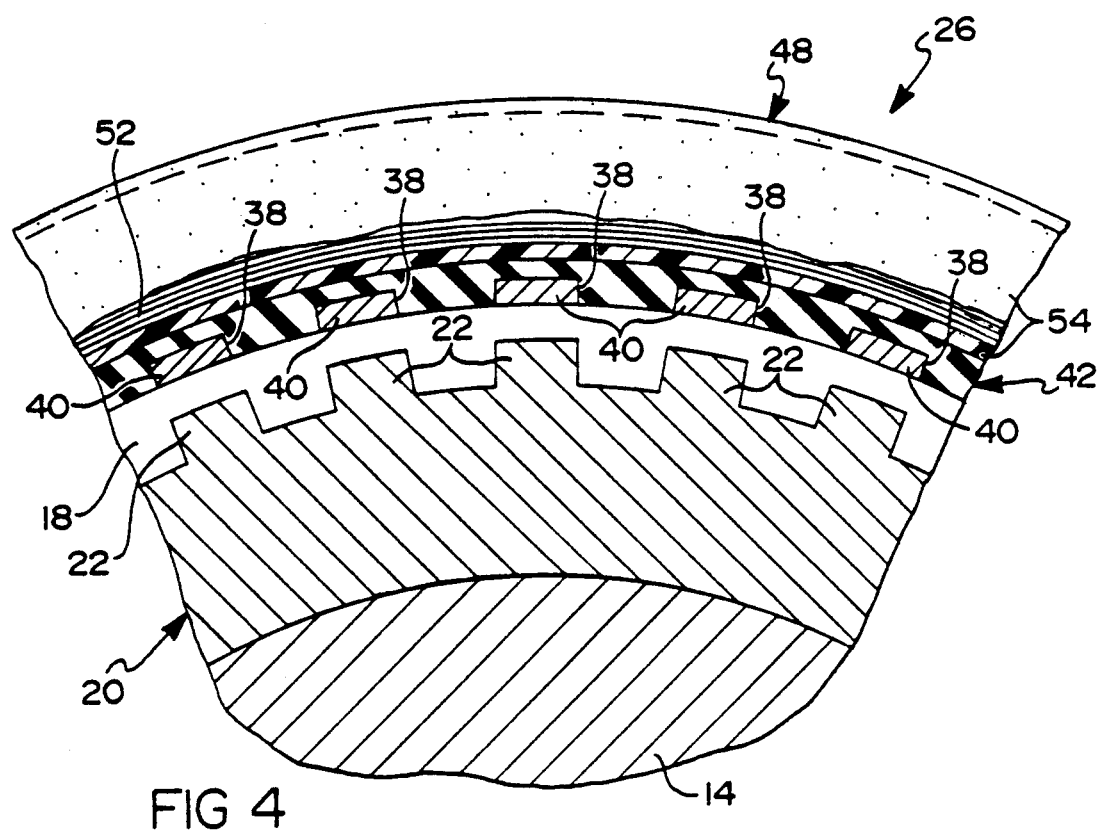
FIG. 4 is a sectional view taken along the line 4—4 in FIG. 2.

Referring next to FIG. 2 and 4, the basic structural foundation of assembly 26 is a stamped steel seal casing of L-shaped cross section, indicated generally at 28. Casing 28 has an annular, radially extending wall 30, abutted with the edge of outer race 12, and a cylindrical, axially extending wall 32 that overlies and is radially spaced from the ring teeth 22. An elastomer sealing strip 34 molded to the end of cylindrical wall 32 rides on a ledge 36 machined into ring 20, to complete the enclosure of space 18. Cylindrical wall 32 is not continuous, being interrupted by a circular array of openings or slots 38 that define a matching array of axially extending fingers 40, which also overlie the teeth 22. Teeth 22 and fingers 40 are kept closely coaxial by the fit of seal casing 28 into outer race 12, see FIG. 4. Fingers 40 and teeth 22 have a relative width that makes them circumferentially alignable. This means that as the inner race 14 rotates, the teeth 22 and fingers 40 will alternately align and misalign in rapid succession, with a radial gap that changes just as quickly from a minimum to a widely disparate maximum, in regular fashion. This action cooperates with the component next described to create a strong wheel speed dependent signal.

Figure 3:
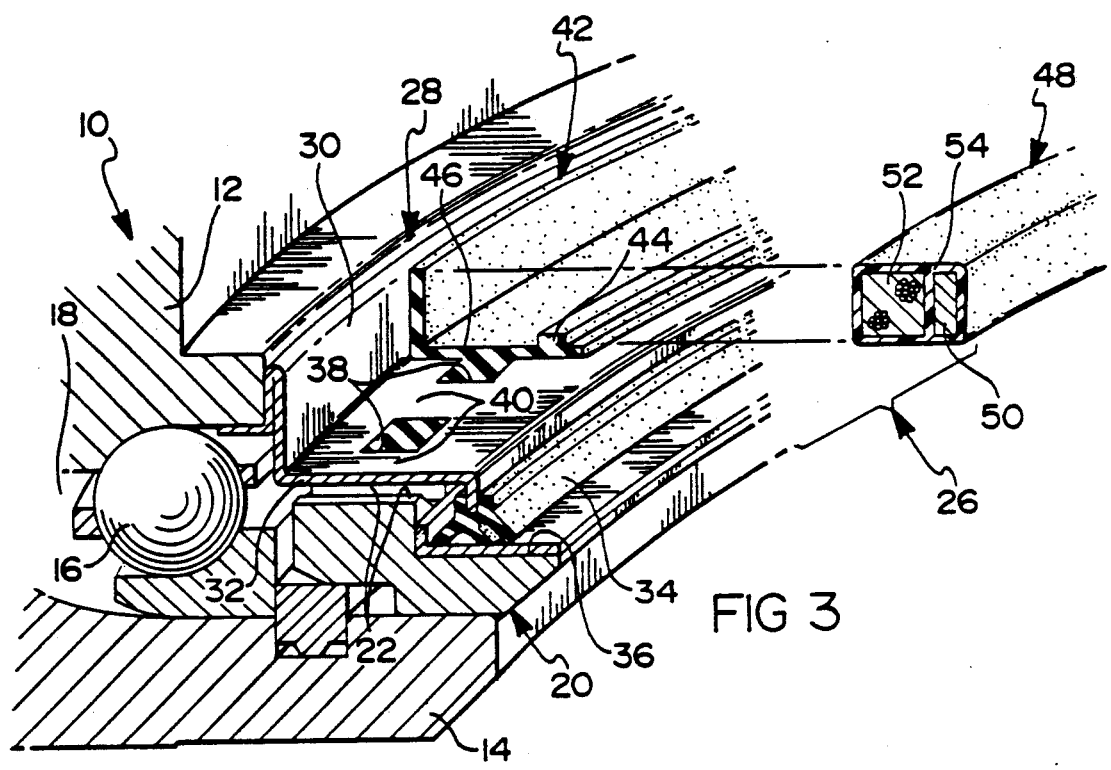
FIG. 3 is a view like 2, but showing the sensor disassembled.

Referring next to FIGS. 3 and 4, an elastomer sleeve, indicated generally at 42, is molded to the outside of casing 28. Specifically, sleeve 42 is molded closely to both walls 30 and 32, thereby taking on the same basic L-shaped cross section and outer dimensions as casing 28, with an outer diameter determined by the cylindrical casing wall 32. In addition, an upstanding circular lip 44 is axially spaced from radial wall 30. Lip 44 thereby creates a channel-shaped trough 46 behind it, which extends axially over the fingers 40 and fills in the slots 38. The elastomer from which sleeve 42 is molded would be similar to sealing strip 34, which is resilient, water repellent and, of course, non-magnetic. Consequently, the slots 38 are sealed from the outside, but remain just as non-magnetic as if they were open, and lip 44 is flexible. The speed sensor component, indicated generally at 48, is the circumferential type, consisting of an annular magnet 50 and spaced wire coil 52, both molded inside a rigid and water tight plastic annular housing 54. Wire signal leads, not illustrated, would exit housing 54 at some point. The inner diameter of housing 54 is substantially equal to, or just slightly less than, the outer diameter of sleeve 42, that is, the diameter of the bottom wall of trough 46. Therefore, housing 54 has a slightly smaller diameter than the upstanding lip 44. Trough 46 is also deliberately molded with an axial width substantially equal to the axial width of sensor housing 54.

Referring next to FIG. 2, the relative sizing of sensor housing 54 and sleeve 42 described above, and the fact that the housing 54, trough 46 and casing wall 32 are all axially extending and radially spaced means that sensor 48 can be easily installed, or removed. To install, housing 54 is pushed axially over sleeve 42, flexing lip 44 out of the way until housing 54 abuts casing wall 30, making a snug fit in trough 46. Sensor 48 is thus accurately positioned, radially and axially, overlaying the fingers 40 and teeth 22. This particular installation method would not be possible if the casing wall 32 were, instead, radially extending and axially spaced from the flux ring 20. In operation, the flux path from magnet 50 passes through the radially spaced fingers 40 and teeth 22, passing most easily when their relative radial gap is at a minimum, least easily when it is at a maximum. This action creates an alternating electrical current signal in coil 52 that is wheel speed related. The annular space 18, and all sensor components, are well sealed from the environment, by sleeve 42, strip 34, and housing 54. Sensor 48, the only component likely to need servicing, can be disassembled easily, by pulling it axially out of trough 46. Doing so does not affect any of the three seals, or open annular space 18. When reassembled, sensor 48 takes on the same radial and axial position that it had before, determined by the two casing walls 30 and 32, and lip 44.

Variations in the preferred embodiment could be made. If the elastomer from which sleeve 42 is molded were sufficiently tacky, sensor housing 54 could be held on well enough just by the tightness of fit, without the need for a lip 44 and radial casing wall 30 to form the trough 46. Lip 44 and the snug fitting trough 46 do provide a secure and accurate axial positioning of the sensor 48. However, sensor 48 is not nearly so sensitive to axial misalignment, as it is the radial gap that is most critical, and this is held accurately by the relation of casing cylindrical wall 32 and ring 20. Sleeve 42 and the slots 38 could be easily and inexpensively retrofitted to any existing speed sensor bearing designs that had an existing cylindrical casing wall, like 32, enclosing an annular space and overlying a flux ring, like 20. No separate components are added, and in fact, the components, such as screws or clips, that would normally be used to hold a conventional sensor in place would be eliminated. Therefore, it will be understood that the invention is not intended to be limited to just the embodiment disclosed.

The embodiments of the invention in which an exclusive property or privilege is claimed are defined as follows:

1. For use in a vehicle bearing having a fixed bearing race and a coaxial rotating race defining an annular space therebetween, and in which said rotating race has a cylindrical array of axially extending portions of magnetic material, a combined seal and speed sensor assembly, comprising, a seal casing mounted to said fixed race and enclosing said annular space, said seal having an axially extending cylindrical wall of magnetic material radially spaced from said portions, said wall also having a circular array of openings cut therethrough so as to form a matching array of fingers overlying said portions, a non-magnetic elastomer sleeve molded to the outside of said seal casing wall overlying said fingers so as to fill in said openings, said sleeve having an outer diameter closely matching that of said cylindrical casing wall, and, a ring-shaped speed sensor having an inner diameter slightly less than said sleeve, whereby, said sensor may be pushed axially over said sleeve making a snug fit therewith and overlying said fingers and portions, and may also be axially removed from said sleeve while still leaving said annular space enclosed.

2. For use in a vehicle bearing having a fixed bearing race and a coaxial, rotating race defining an annular space therebetween, and in which said rotating race has a cylindrical array of axially extending projections of magnetic material formed thereon, a combined seal and speed sensor assembly, comprising, a seal casing mounted to said fixed race and enclosing said annular space, said seal having an axially extending cylindrical wall of magnetic material radially spaced from said projections, said wall also having a circular array of openings cut therethrough so as to form a matching array of fingers overlying said projections, a non-magnetic elastomer sleeve molded to the outside of said seal casing wall so as to fill in said openings, said sleeve having a flexible circular lip formed in front of an axially extending channel-shape trough that overlies said fingers, and, a ring-shaped speed sensor having an inner diameter slightly less than said sleeve lip and substantially equal to said trough, whereby, said sensor may be pushed axially over said sleeve lip to fit snugly into said channel and overlying said fingers and projections, and may also be axially removed from said sleeve while still leaving said annular space enclosed.

3. In a vehicle bearing having a fixed bearing race and a coaxial, rotating race defining an annular space therebetween, a variable reluctance ring mounted to said rotating race within said annular space with a cylindrical array of axially extending teeth, and a seal casing mounted to said fixed race and enclosing said annular space with an an axially extending cylindrical wall of magnetic material radially spaced from said teeth, the improvement comprising, a circular array of openings cut through said casing wall so as to form a matching array of fingers overlying said projections, a non-magnetic elastomer sleeve molded to the outside of said seal casing wall overlying said fingers so as to fill in said openings, said sleeve having an outer diameter closely matching that of said cylindrical casing wall, and, a ring-shaped coil and magnet type speed sensor having an inner diameter slightly less than said sleeve, whereby, said sensor may be pushed axially over said sleeve making a snug fit therewith and overlying said fingers and teeth, and may also be axially removed from said sleeve while still leaving said annular space enclosed.

* * * * *